United States Patent
Kohama

[15] 3,685,721
[45] Aug. 22, 1972

[54] CENTRIFUGAL SEPARATION APPARATUS FOR SEWAGE

[72] Inventor: Mashiro Kohama, 533 Nakaratomachi, Minami-ku, Yokohama-shi, Kanagawa-ken, Japan

[22] Filed: Oct. 9, 1970

[21] Appl. No.: 79,587

[30] Foreign Application Priority Data
June 22, 1970  Japan ...................... 45/54263

[52] U.S. Cl. ..................................... 233/7, 233/28
[51] Int. Cl. ............................................. B04b 1/00
[58] Field of Search ...... 233/7, 1 R, 27, 28, 46, 47 R; 259/32, 33; 210/380

[56] References Cited

UNITED STATES PATENTS 1,564,665  12/1925  Gates ............................ 233/7
1,044,570  11/1912  Raasloff et al. .......... 233/28 X

*Primary Examiner*—Jordan Franklin
*Assistant Examiner*—George H. Krizmanich
*Attorney*—Fidelman, Wolffe & Leitner

[57] ABSTRACT

A centrifugal sewage separation apparatus containing a drum with plural solids receiving channels of varying widths, conveying means in the channels, water separation means, and control means for the conveying means.

4 Claims, 6 Drawing Figures

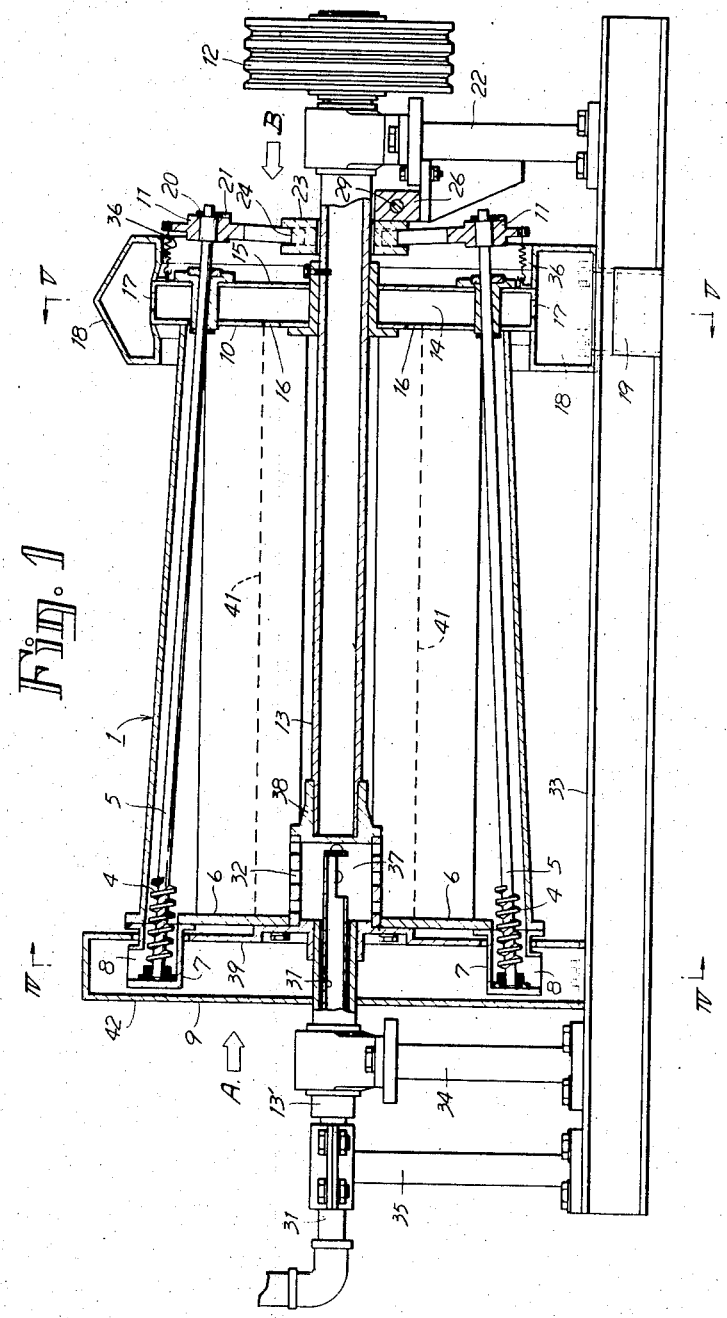

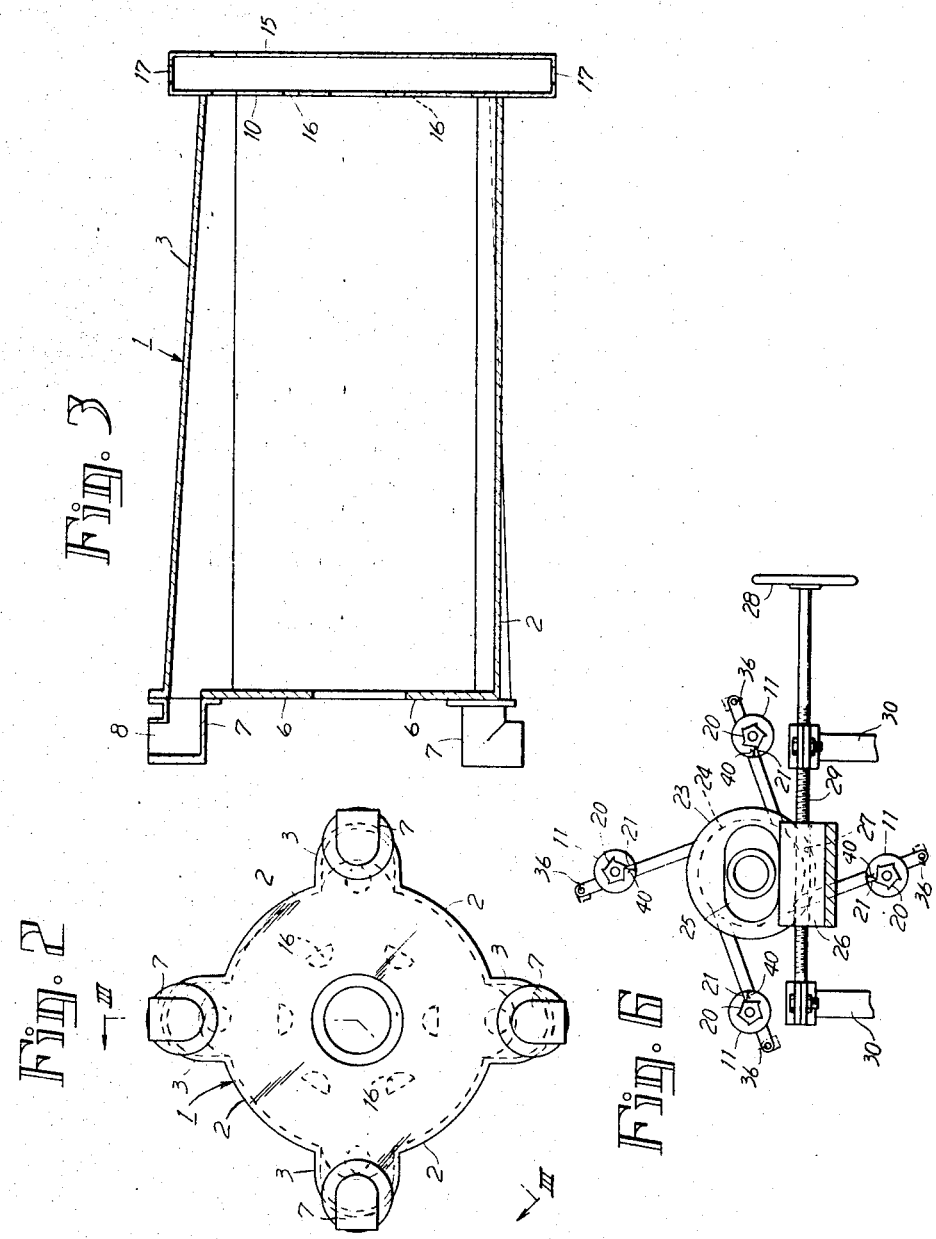

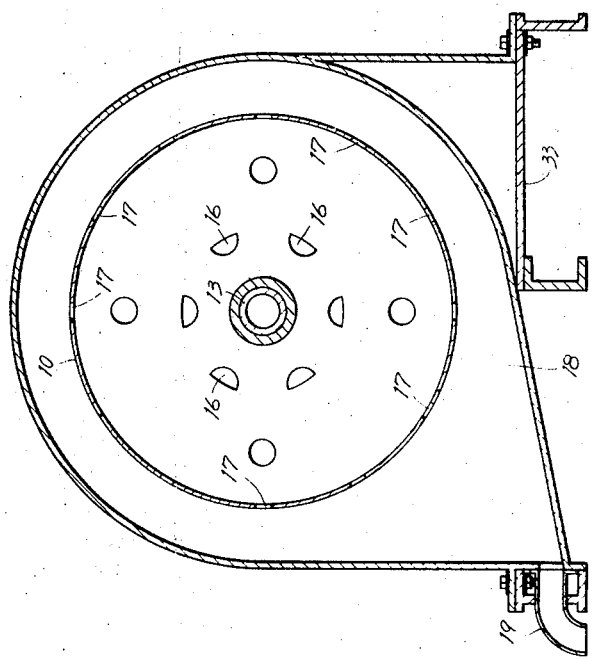
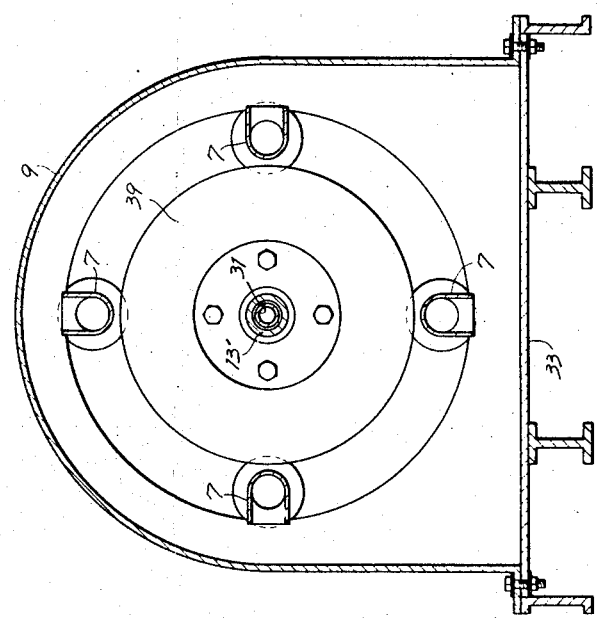

CENTRIFUGAL SEPARATION APPARATUS FOR SEWAGE

BACKGROUND OF THE INVENTION

1. Field of the Invention

The present invention is directed to centrifugal separation apparatus for sewage produced by the washing of concrete mixing cars, or sewage, including solid material, produced during washing of, e.g., equipment, at manufacturing plants. The apparatus separates the sewage into solid material and water portions and continuously discharges the solid material and the water from separate outlets.

2. Description of the Prior Art

Many types of centrifugal separation apparatus for sewage have been devised, but generally all of such systems are complex in structure, tend to break easily and, in some instances, are dangerous to human beings. Furthermore, since the degree of separation of water is not as high as desired, chemical agents are often added to enhance the degree of separation. This, however, is not always effective. When the sewage is to be treated with chemical agents or the like, the added chemical agents must also be treated so that they do not result in harm to the public. Thus, double or sometimes triple treatment may be required.

SUMMARY OF THE INVENTION

The present invention overcomes the above shortcomings of the prior art sewage disposing apparatus, and provides a sewage disposing apparatus of simple construction which is capable of separating sewage into water and solid material independent of variations in the quantity of the sewage and also independent of the amount of solid material contained in the sewage, thus providing for disposal of the sewage without plural treatments and possible public harm.

Accordingly, an object of the present invention is to separate sewage automatically and effectively into solid material and water, the sewage usually being produced during washing of a concrete mixing car or during washing at manufacturing plants.

Another object is to accomplish such separation with apparatus of simple structure and construction, with high reliability and without danger to human beings.

Still another object is to accomplish the above objects without using any additional chemical agents, thus without requiring further disposal of the chemical agents, preventing public harm, and permitting the separated water to be discharged to a river without necessitating further treatment.

A further object is to provide a relatively inexpensive machine for such sewage disposal.

Other objects and a complete understanding of the invention will be apparent from the following detailed description and explanation which refers to the accompanying drawings illustrating the present preferred embodiment.

DESCRIPTION OF THE DRAWING

FIG. 1 is a longitudinal cross-sectional view of a centrifugal separation apparatus of the present invention;

FIG. 2 is an end view of a rotating drum taken from the direction of the arrow A in FIG. 1;

FIG. 3 is a view in cross section of the rotating drum taken along the plane 3—3 of FIG. 2;

FIG. 4 shows a structure of a hollow chamber provided to prevent scattering of solids, taken along the plane 4—4 of FIG. 1;

FIG. 5 shows a structure of a discharge chamber, taken from the line 5—5 of FIG. 1; and FIG. 6 shows an assembled construction of the levers, ratchet wheels, cams, etc., taken from the direction of the arrow B in FIG. 1.

DESCRIPTION OF THE PREFERRED EMBODIMENT

Referring now in detail to the drawings, numeral 1 designates a rotating drum which, as seen from FIGS. 2 and 3, is formed from a cylindrical body 2 having uniform diameter over its entire length and arcuate channels 3 at several points along the body 2. The width of the channels becomes wider as it runs from end to end (from right end to left end in FIG. 3), since the channels 3 have bottoms inclined from one end to the other to effectively move the separated solids accumulated therein towards the deeper bottom sections by centrifugal force.

Mounted in the channels 3 of rotating drum 1 are shafts 5 having spiral wings (screws) 4 secured at least at one end. In FIG. 1, the spiral wings 4 extend into guide tube 7 provided at appropriate intervals on the adjacent circumferential edges of end plates 6 which block the left hand end of rotating drum 1. The ends of spiral wings 4 extend to openings 8 passing through a portion of the peripheral surface of guide tubes 7. The shafts 5 (having the spiral wings 4) serves as a screw conveyor. In the illustrated embodiment, the spiral wings 4 are provided at the tip ends of shafts only, since the solids will move to the spiral wings 4 under the action of centrifugal force along the under edges of the channels which become deeper as the material runs from the right end to the left end. It should be appreciated that spiral wings may be provided along the entire length of the shafts 5.

The guide tube 7 having opening 8 extends from an annular opening formed in the end plate of hollow chamber 9 located adjacent to an end plate 6 of rotating drum 1 and into the hollow chamber 9. The chamber 9 serves to prevent scattering of the solids separated from the sewage supplied to the rotating drum and conveyed through the screw conveyor consisting of the spiral wings and shafts.

At the right hand end of FIG. 1, the shafts 5 of the screw conveyor project outwardly through end plates 10 and 15 of water collecting chamber 14 which blocks the right end of the rotating drum 1. Mounted on shafts 5 is a ratcheted wheel driving means attached so that the swinging motion of levers 11 of the driving means allows the pivotal movement of shafts 5.

At the center of rotating drum 1, a tubular supporting shaft 13 is provided, and at the right hand end of shaft 13 which passes through said water collecting chamber 14, a driving pulley 12 is also provided which is movably supported on bearing cylinder body 22 projecting on base 33.

Overflow holes 16 are formed in the water collecting chamber 14 at a position relatively close to tubular supporting shaft 13, and the separated water that flows out therefrom by centrifugal force and is scattered out of drain holes 17 formed in the peripheral surface of chamber 14. The separated water is then drained from discharge opening 19 at the lower section of drain chamber 18 surrounding water collecting chamber 14.

On the other hand, the left hand section of tubular supporting shaft 13, as shown in FIG. 1, blocks the opening of shaft 13 by a plate 38 which is of larger diameter than that of supporting shaft 13, and forms chamber 37 by joining with end plate 6 of rotating drum 1. The opening of chamber 37 is blocked by annular end plate 39 located at one end of tubular supporting shaft 13', which extends on the common center line of tubular supporting shaft 13 in order to be supported by bearing cylinder body 34.

Inserted into the tubular supporting shaft 13' is a sewage inlet pipe 31 supported by a supporting cylinder body 35. The tip end of pipe 31 extends into the inside of the chamber 37 of rotating drum 1. The sewage is poured into rotating drum 1 through openings 32 provided on the peripheral surface of chamber 37.

As shown in FIG. 6, a ratchet wheel 20 is journaled at the end of one of shafts 5 of the screw conveyor and a lever 11 is pivotably mounted so as to be continuously pressed to a peripheral surface of a cam 23, described below, by a spring 36. A ratchet 21 is pivotably mounted to the lever 11 and continuously pressed, at its tip end, to the ratchet wheel 20 by a spring 40, thus engaging each piece.

As seen from FIG. 1, cam 23 is provided between end plate 15 of water collecting chamber 14 and bearing cylinder body 22 (supporting tubular supporting shaft 13). The ends of levers 11 slidably engage with cam 23. The cam, as seen from FIG. 6, is made from a disc, and has an annular recess 24 on the outer periphery thereof with which the end of the lever 11 slidably engages. The cam 23 is formed with a slot 25 through which the tubular supporting shaft 13 extends without making contact with the cam 23. The cam has a support member at the lower portion of one of its end surfaces which includes a threaded hole 27 extending centrally in a longitudinal direction. A screw rod 29 having handle 28 at one end thereof is screwed into threaded hole 27 and movably supports brackets 30. Thus, when the screw rod 29 is rotated by handle 28, supporting member 26 is advanced or retarded, as the case may be, and hence, cam 23, positioned against supporting member 26, is correspondingly rotated around tubular supporting shaft 13 which lies on the center line of rotating drum 1.

Since the rotating drum 1 rotates with the tubular supporting shafts 13 about the center thereof, shaft 5 of the screw conveyor is also rotated about supporting shaft 13. Thus, when the lever 11, pivotably mounted on shaft 5, rocks to slidably engage the annular recess on the outer periphery of the cam 23, levers 11 swing around shafts 5 to advance the ratchet wheel 20 step by step through the ratchet 21 and thus rotate the shafts 5.

When cam 23 is rotated by turning the handle 28, the range of swing of levers 11 is altered, thereby the ratchet 21 can advance the ratchet wheel 20 not one step at a time but two or more steps at a time. In this manner, the number of the rotations of shafts 5 and hence the number of rotations of the screw conveyor relative to the rotation of drum 1 may be varied as desired.

The operation of the centrifugal separation apparatus of the present invention constructed as described above will now be explained.

Driving pulley 12 is first started by a driving motor (not shown) to rotate drum 1 for injecting the sewage from sewage inlet pipe 31 into the rotary drum. Then, as the rotational speed increases, the sewage starts to be separated into water and solids by a centrifugal force, the solids being pressed against inner surface only of the rotary drum and being gradually accumulated at the channel 3. Since channel 3 becomes wider as it runs from the right to the left, as seen from FIG. 1, the solids in the right section are moved toward the left section by a centrifugal force. Thus, in this case, the shafts 5 of the screw conveyor may be kept inactive until a sufficient amount of solids have accumulated. As the sewage continues to flow into the rotary drum, it is separated into solids and water while the water level tends to be kept in the state shown by dotted line 41. Since there is no other avenue for removal, the water flows from overflow hole 16 formed in right hand end plate 10 of the rotary drum and into water collecting chamber 14. From there it flows out through drain hole 17 and discharge opening 19 of discharge chamber 18. At this moment, since the solids have already been moved to the inner wall of the rotary drum by centrifugal force, the separated water does not include solids.

When an appropriate amount of solids is accumulated in channel 3 of drum 1 during the above operation, handle 28 is operated to shift lever 23 by an appropriate distance from the center of the supporting shaft 13 to swing the lever 11. Thus, as discussed above, shafts 5 of the screw conveyor are rotated, and, in turn, drop the solids from guide tubes 7 formed in end plate 6 of the rotary drum. The solids drop into chamber 9 which prevents them from scattering. The solids are then carried away by a conveyor belt or another convenient means, not shown.

As described hereinabove, the centrifugal separation apparatus for sewage in accordance with the present invention is of extremely simple construction as compared with prior art apparatus and hence the possibility of failure is less. Further, the apparatus of the present invention is easy to handle, it can separate sewage into water and solid automatically and highly efficiently while sewage is continuously injected into the rotating drum 3. Furthermore, it is possible to change the number of rotations of shafts 5 of the screw conveyor relative to the number of rotations of the rotary drum 3 so as to properly control the operation of the apparatus depending on the solids content of the sewage.

What is claimed is:

1. A continuous sewage treatment apparatus comprising a cylindrical body, a plurality of arcuate channels formed longitudinally on said body, said channels having an increasing width from one end to the other, end closure means for said cylindrical body, inlet means for said sewage, outlet means for water separated by the apparatus, outlet means for solids, said outlet means being an screw conveyor in said arcuate channel, means to rotate said body, and means to adjust the rotational speed of said screw conveyor relative to the rotational speed of said body.

2. The apparatus of claim 1 wherein said means to adjust the rotational speed of said screw conveyor comprises an adjustable cam along said means to rotate said body, ratchet means for engaging said cam with said screw conveyor means, and means to adjust the position of said cam for controlling the degree of rotation of said ratchet means.

3. A continuous sewage separation apparatus comprising a cylindrical body, a plurality of arcuate channels formed longitudinally on said body, said channels having an increasing width from one end to the other, guide tubes extending from said channels to exterior end plates blocking one end, the other ends of said channels being blocked in a water collecting chamber to form a rotary drum, means for supporting the rotary drum on a supporting shaft located along the center line of the drum, a chamber consisting of at least a portion of said supporting shaft to provide a sewage inlet for introducing the sewage into the drum, a drain hole in the water collecting chamber located closer to the supporting shaft than to the guide tubes for discharging separated water out of said drum, a shaft of a screw conveyor having a spiral wing on at least a portion thereof within each of said channels, the end of the shaft having the spiral wing being faced into the guide tubes, a ratchet wheel provided at the other end of the shaft to be moved therewith, a lever pivotably mounted to the shaft at said other end, a cam shiftably mounted to the supporting shaft of the rotary drum, and means for slidably engaging said lever with a peripheral edge of said cam.

4. The continuous separation apparatus for sewage according to claim 3, which further comprises a disc having a slot at its center through which one end of the supporting shaft of the rotary drum extends and an annular recess on its outer peripheral surface, said disc being supported by a support on its operation shaft, means for continuously slidably engaging the end of the lever, pivotably mounted at the end of the shaft of the screw conveyor, with the recess of said disc, and a cam means including said disc for engaging said lever to produce the desired amount of rotation with respect to the supporting shaft of the rotary drum, in response to the movement of said operation shaft.

* * * * *